(12) United States Patent
Park et al.

(10) Patent No.: US 11,161,942 B2
(45) Date of Patent: Nov. 2, 2021

(54) METHOD FOR PREPARING SUPERABSORBENT POLYMER

(71) Applicant: LG Chem, Ltd., Seoul (KR)

(72) Inventors: Sung Soo Park, Daejeon (KR); Gicheul Kim, Daejeon (KR); Jeong Kug Cho, Daejeon (KR); Ki Hyun Kim, Daejeon (KR); Yong Seok Choi, Daejeon (KR)

(73) Assignee: LG Chem, Ltd.

( * ) Notice: Subject to any disclaimer, the term of this patent is extended or adjusted under 35 U.S.C. 154(b) by 132 days.

(21) Appl. No.: 16/485,607

(22) PCT Filed: Jan. 25, 2019

(86) PCT No.: PCT/KR2019/001109
§ 371 (c)(1),
(2) Date: Aug. 13, 2019

(87) PCT Pub. No.: WO2019/194399
PCT Pub. Date: Oct. 10, 2019

(65) Prior Publication Data
US 2020/0247960 A1    Aug. 6, 2020

(30) Foreign Application Priority Data
Apr. 3, 2018  (KR) .......................... 10-2018-0038632

(51) Int. Cl.
*C08F 2/46*         (2006.01)
*C08F 2/50*         (2006.01)
*C08G 61/04*        (2006.01)
*C08J 3/12*         (2006.01)
*C08J 3/075*        (2006.01)
*C08J 3/24*         (2006.01)

(52) U.S. Cl.
CPC .............. *C08J 3/12* (2013.01); *C08J 3/075* (2013.01); *C08J 3/245* (2013.01); *C08J 2333/02* (2013.01)

(58) Field of Classification Search
CPC ..... C08J 3/245; C08J 3/12; C08J 3/075; C08J 2333/02; C08F 220/06; C08F 220/102; C08F 2/10; B29B 7/94; B29B 7/005; B29B 9/16; B29B 9/12; B29B 2009/125; B29B 2009/161
USPC ........... 522/59, 49, 6, 189, 184, 71, 1; 520/1
See application file for complete search history.

(56) References Cited

U.S. PATENT DOCUMENTS

| 5,002,986 A | 3/1991 | Fujiura et al. |
| 2011/0040049 A1 | 2/2011 | Saita et al. |
| 2011/0319518 A1 | 12/2011 | Kadonaga et al. |
| 2012/0016084 A1 | 1/2012 | Dairoku et al. |
| 2012/0184684 A1 | 7/2012 | Funk et al. |
| 2016/0012972 A1 | 1/2016 | Takatani et al. |
| 2016/0367965 A1 | 12/2016 | Kim et al. |
| 2018/0305503 A1 | 10/2018 | Lim et al. |

FOREIGN PATENT DOCUMENTS

| EP | 1690887 A1 | 8/2006 | |
|---|---|---|---|
| EP | 3321306 A1 | 5/2018 | |
| EP | 3333198 A1 | 6/2018 | |
| JP | H11106514 A | 4/1999 | |
| JP | 2013507466 A | 3/2013 | |
| JP | 2016216713 A | 12/2016 | |
| KR | 20100126372 A | 12/2010 | |
| KR | 20140145810 A | 12/2014 | |
| KR | 20150061270 A | 6/2015 | |
| KR | 20150068322 A | 6/2015 | |
| KR | 20170106154 A | 9/2017 | |
| KR | 1020170106154 * | 9/2017 | |
| KR | 20180003815 A | 1/2018 | |
| WO | 2010100936 A1 | 9/2010 | |
| WO | 2010114058 A1 | 10/2010 | |
| WO | WO-2014077612 A1 * | 5/2014 | .......... B01J 20/3021 |
| WO | 2014155419 A1 | 10/2014 | |
| WO | WO-2014155419 A1 * | 10/2014 | ............... H01G 9/08 |
| WO | 2017010660 A1 | 1/2017 | |

OTHER PUBLICATIONS

Lee et al, WO 2014/077612 Machine Translation, May 22, 2014 (Year: 2014).*
Takatoni et al, WO 2014155419 Machine Translation, Oct. 2, 2014 (Year: 2014).*
Im et al, KR 1020170106154 Machine Translation, Sep. 20, 2017 (Year: 2017).*
George Odian, Principles of Polymerization, book, 1981, p. 203, Second Edition, John Wiley & Sons, Inc., United States of America.
Reinhold Schwalm, UV Coatings: Basics, Recent Developments and New Application, book, Dec. 2006, p. 115, Elsevier Science.
International Search Report for Application No. PCT/KR2019/001109, dated May 13, 2019, pp. 1-2.
Extended European Search Report for Application No. 19756315.8, dated Mar. 22, 2021, 14 pages.
Thomson Scientific, London, GB; AN 2018-05407V; Jan. 10, 2018.

* cited by examiner

*Primary Examiner* — Jessica Whiteley
(74) *Attorney, Agent, or Firm* — Lerner, David, Littenberg, Krumholz & Mentlik, LLP

(57) ABSTRACT

A method for preparing a superabsorbent polymer, and more particularly, a method for preparing a superabsorbent polymer in which it is possible to stably operate a process for preparing a fine powder reassembly while maintaining assembly strength of the fine powder reassembly, wherein a refined ratio is reducible, and an initial absorption speed of the superabsorbent polymer is improved, by adjusting a stirring speed and divisionally adding water to a fine powder in a process for the preparation of the fine powder reassembly, is provided.

10 Claims, 2 Drawing Sheets

METHOD FOR PREPARING SUPERABSORBENT POLYMER

CROSS-REFERENCE TO RELATED APPLICATIONS

This application is a national phase entry under 35 U.S.C. § 371 of International Application No. PCT/KR2019/001109, filed Jan. 25, 2019, which claims priority to Korean Patent Application No. 10-2018-0038632, filed Apr. 3, 2018, the entire contents of which are incorporated herein by reference.

TECHNICAL FIELD

The present invention relates to a method for preparing a superabsorbent polymer, and more particularly, to a method for preparing a superabsorbent polymer in which it is possible to stably operate a process for preparing a fine powder reassembly while maintaining assembly strength of the fine powder reassembly, a refined ratio is reducible, and an initial absorption speed of the superabsorbent polymer is improved, by adjusting a stirring speed and divisionally adding water to a fine powder in a process for the preparation of the fine powder reassembly.

BACKGROUND ART

A superabsorbent polymer (SAP) is a synthetic polymeric material capable of absorbing water at about five hundred to one thousand times its own mass. Commercial production of the SAP began for use in sanitary products, but now the SAP may be found in a very wide range of applications, including water-holding materials for soils for gardening, water-stop materials for engineering and construction, sheets for raising seedlings, freshness-keeping agents in the food distribution field, and materials for poulitices, as well as personal hygiene products such as disposable baby diapers.

An absorption mechanism of the superabsorbent polymer is governed by interaction of osmotic pressure due to a difference in electrical attraction caused by charges of a polymer electrolyte, affinity between water and a polymer electrolyte, molecular expansion due to repulsion between polymer electrolyte ions, and inhibition of expansion due to cross-linking. In other words, water absorbency of the superabsorbent polymer depends on the above-described affinity and molecular expansion, and an absorption speed depends greatly on osmotic pressure of an absorbent polymer itself.

Generally, about 20 to 30% of a fine powder is generated during pulverization and transportation in a method for preparing a superabsorbent polymer. Since the fine powder affect absorbency under pressure (AUP) and permeability of the superabsorbent polymer, it is difficult to prepare a superabsorbent polymer having both physical properties at the same time.

In addition, the fine powder forms large particles through a fine powder reassembling process in which the fine powder and water are mixed and agglomerated. However, when excessive agglomeration occurs in the process of mixing and reassembling the fine powder and water, a load on a device is increased, which makes continuous operation difficult.

Therefore, in order to continuously prepare a superabsorbent polymer, it is necessary to operate a stable fine powder reassembling process. Particularly, in the case of an absorbent polymer having a high initial absorption speed, a stable fine powder reassembly operation is essential.

DISCLOSURE

Technical Problem

The present invention has been made in an effort to provide a method for preparing a superabsorbent polymer in which it is possible to stably operate a process for fine powder reassembly while maintaining assembly strength of the fine powder reassembly, and in which a refined ratio is reducible and an initial absorption speed of the superabsorbent polymer is improved, by adjusting a stirring speed and divisionally adding water to a fine powder in a process for the preparation of the fine powder reassembly.

Technical Solution

An exemplary embodiment of the present invention provides a method for preparing a superabsorbent polymer, including:

preparing a hydrogel polymer by performing thermal polymerization or photopolymerization on a monomer composition including a water-soluble ethylene-based unsaturated monomer and a polymerization initiator;

drying the hydrogel polymer, pulverizing the dried polymer, and classifying the pulverized polymer into a fine powder having a particle diameter of 150 µm or less and a normal particle having a particle diameter of more than 150 µm to 850 µm or less; and preparing a fine powder reassembly by mixing the fine powder with water while stirring at a linear velocity of 6.5 to 14.5 m/s, followed by reassembling, wherein water is added dividedly to the fine powder two times or more in the mixing of the fine powder and water.

Advantageous Effects

In the method for preparing a superabsorbent polymer according to the present invention, it is possible to stably operate a process for preparing a fine powder reassembly while maintaining assembly strength of the fine powder reassembly, while a refined ratio may be reduced.

In addition, a superabsorbent polymer having a high initial absorption speed may be prepared by the preparation method as described above.

MODE FOR INVENTION

Figure 1:
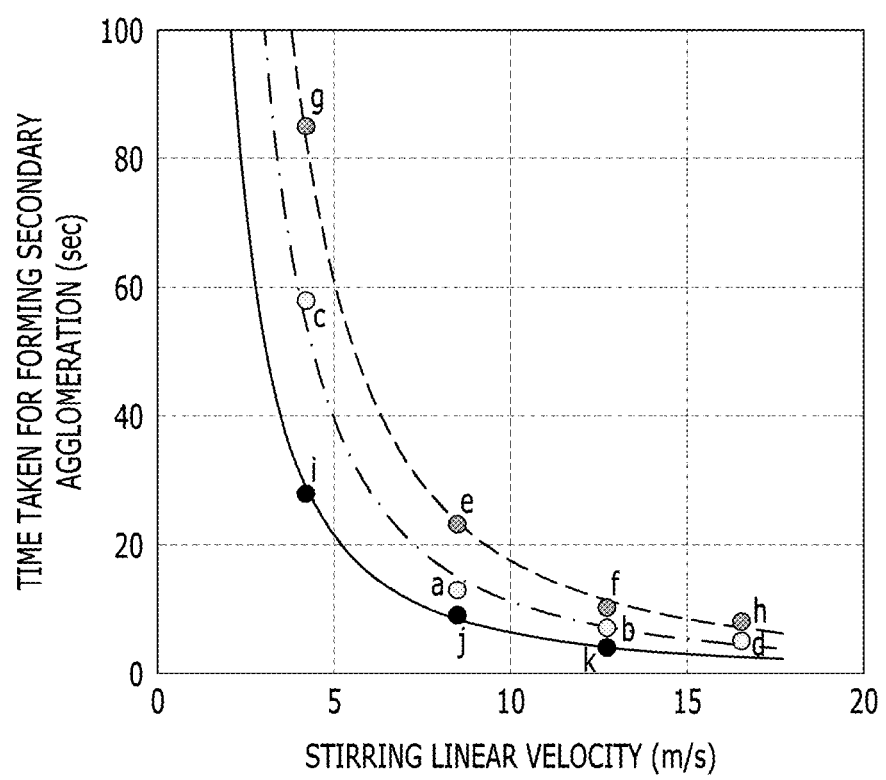
FIG. 1 is a graph showing results of comparing a change in time taken for forming a secondary agglomeration depending on a stirring linear velocity.

The terms used herein are only for the purpose of describing exemplary embodiments, and are not intended to limit the present invention. Singular expressions include plural expressions unless expressly stated otherwise in the context. It will be further understood that the terms "comprises", "includes", and/or "has", when being used in this specification, specify the presence of stated features, steps, components, or combinations thereof, but do not exclude the presence or addition of one or more other features, steps, components, or combinations thereof.

The present invention may be variously modified and may have various forms, and thus specific embodiments are illustrated and described in detail below. However, the present invention is not limited to the specific embodiments and should be construed as including all changes, equivalents, and substitutions included in the spirit and scope of the present invention.

In the present invention, the term "fine powder" refer to particles having a particle diameter of 150 μm or less among polymers obtained by polymerizing water-soluble ethylene-based unsaturated monomers in which an acidic group is included and at least a portion of the acidic group is neutralized, and may include a fine powder that is generated in all processes of a superabsorbent polymer, for example, a polymerization process, a drying process, a pulverization process of the dried polymer, a surface cross-linking process, and the like, regardless of a step of generating the fine powder, whether or not surface cross-linking is performed, or the like.

Further, in the present invention, the term "fine powder reassembly" may refer to a fine powder that is obtained by mixing the fine powder with water, followed by reassembling, or by further mixing with a mixture mixture stabilizer in addition to water.

Hereinafter, a method for preparing a superabsorbent polymer according to a specific embodiment of the present invention is described in more detail.

The method for preparing a superabsorbent polymer according to an embodiment of the present invention includes:

preparing a hydrogel polymer by performing thermal polymerization or photopolymerization on a monomer composition including a water-soluble ethylene-based unsaturated monomer and a polymerization initiator (step 1);

drying the hydrogel polymer, pulverizing the dried polymer, and classifying the pulverized polymer into a fine powder having a particle diameter of 150 μm or less and a normal particle having a particle diameter of more than 150 μm to 850 μm or less (step 2); and preparing a fine powder reassembly by mixing the fine powder with water while stirring at a linear velocity of 6.5 to 14.5 m/s, followed by reassembling (step 3), wherein when mixing the fine powder with water, water is added in two or more divisions with respect to the fine powder.

For reference, the term "polymer" in the present specification means that a water-soluble ethylene-based unsaturated monomer is in a polymerized state, and may include all water content ranges, all particle diameter ranges, and all surface cross-linking states or processing states. Among the polymers, a polymer in which a moisture content (water content) is about 40 wt % or more before drying is performed after polymerization may be referred to as a hydrogel polymer. Further, among the polymers, a polymer having a particle diameter of 150 μm or less may be referred to as "fine powder".

In addition, "the superabsorbent polymer" means the polymer itself according to the context, or includes all polymers in a state suitable for commercialization through further processes such as surface cross-linking, fine powder reassembly, drying, pulverization, classification, or the like, with respect to the polymer.

Hereinafter, the method for preparing a superabsorbent polymer is described in more detail for each step.

In the method for preparing a superabsorbent polymer of the present invention, step 1 is a step of preparing a hydrogel polymer.

The hydrogel polymer may be prepared by performing thermal polymerization or photopolymerization on a monomer composition including a water-soluble ethylene-based unsaturated monomer and a polymerization initiator.

The monomer composition which is a raw material of the superabsorbent polymer includes the water-soluble ethylene-based unsaturated monomer and the polymerization initiator.

The water-soluble ethylene-based unsaturated monomer may be any monomer generally used in preparing the superabsorbent polymer without any particular limitations. Here, the water-soluble ethylene-based unsaturated monomer may be at least any one selected from the group consisting of anionic monomers and salts thereof, nonionic hydrophile-containing monomers, and unsaturated monomers containing amino groups, and quaternary compounds thereof.

Specifically, the water-soluble ethylene-based unsaturated monomer may be at least any one selected from the group consisting of anionic monomers such as methacrylic acid, anhydrous maleic acid, fumaric acid, crotonic acid, itaconic acid, 2-acryloyl ethane sulfonic acid, 2-methacryloyl ethane sulfonic acid, 2-(meth)acryloyl propane sulfonic acid, and 2-(meth)acrylamide-2-methyl propane sulfonic acid, and salts thereof; nonionic hydrophile-containing monomers such as (meth)acrylamide, N-substituted(meth)acrylate, 2-hydroxyethyl(meth)acrylate, 2-hydroxypropyl(meth)acrylate, methoxypolyethylene glycol(meth)acrylate, and polyethylene glycol(meth)acrylate; and unsaturated monomers containing amino groups such as (N,N)-dimethylaminoethyl(meth)acrylate and (N,N)-dimethylaminopropyl(meth)acrylamide, and quaternary compounds thereof.

More preferably, the acrylic acid or salts thereof, for example, an acrylic acid and alkali metal salts such as sodium salts thereof may be used. By using the monomer, it is possible to prepare a superabsorbent polymer having excellent physical properties. When the alkali metal salt of the acrylic acid is used as the monomer, the acrylic acid may be neutralized with a basic compound such as caustic soda (NaOH) and used.

A concentration of the water-soluble ethylene-based unsaturated monomer may be controlled in consideration of polymerization time, reaction condition, and the like. However, when the concentration of the monomer is excessively low, the superabsorbent polymer may have a low yield and an economic problem. On the other hand, when the concentration thereof is excessively high, process problems may occur, for example, a part of the monomer may precipitate, pulverization efficiency may be low at the time of pulverizing the polymerized hydrogel polymer, or the like, and physical properties of the superabsorbent polymer may be deteriorated. The monomer may have an amount of about 20 to about 60 wt %, and preferably about 40 to about 50 wt %, based on a monomer composition including raw materials of the superabsorbent polymer and a solvent.

In the method for preparing a superabsorbent polymer of the present invention, the polymerization initiator used in polymerization is not particularly limited as long as it is generally used in the preparation of the superabsorbent polymer.

Specifically, as the polymerization initiator, a thermal polymerization initiator or a photopolymerization initiator according to UV irradiation may be used depending on a polymerization method. Meanwhile, even if the photopolymerization method is performed, the thermal polymerization initiator may be additionally included since a predetermined amount of heat occurs by ultraviolet irradiation or the like, and in addition, as the polymerization reaction which is an exothermic reaction, some degree of heat occurs.

The photopolymerization initiator may be used without limitation in view of constitution as long as it is a compound capable of forming a radical by light such as ultraviolet rays.

The photopolymerization initiator may be, for example, at least one selected from the group consisting of benzoin ether, dialkyl acetophenone, hydroxyl alkyl ketone, phenyl glyoxylate, benzyl dimethyl ketal, acyl phosphine, and α-aminoketone. Meanwhile, as a specific example of the acylphosphine, a commonly used Lucirin TPO, that is, 2,4,6-trimethyl-benzoyl-trimethyl phosphine oxide, may be used. More various photo-polymerization initiators are described in "UV Coatings: Basics, Recent Developments and New Application (Elsevier, 2007)", page 115, written by Reinhold Schwalm. However, the present invention is not limited to the above-described examples.

The photopolymerization initiator may be included at a concentration of about 0.01 to about 1.0 wt % based on the monomer composition. When the concentration of the photopolymerization initiator is excessively low, a polymerization speed may be reduced. When the concentration of the photopolymerization initiator is excessively high, a molecular weight of the superabsorbent polymer may be small and physical properties thereof may be non-uniform.

In addition, the thermal polymerization initiator may be at least one selected from the group consisting of a persulfate-based initiator, an azo-based initiator, hydrogen peroxide, and an ascorbic acid. Specifically, examples of the persulfate-based initiator may include sodium persulfate ($Na_2S_2O_8$), potassium persulfate ($K_2S_2O_8$), ammonium persulfate (($NH_4)_2S_2O_8$), and and examples of the azo-based initiator may include 2,2-azobis(2-amidinopropane)dihydrochloride, 2,2-azobis-(N,N-dimethylene)isobutyramidine dihydrochloride, 2-(carbamoylazo)isobutyronitrile, 2,2-azobis[2-(2-imidazolin-2-yl)propane]dihydrochloride, 4,4-azobis-(4-cyanovaleric acid), and the like. More various thermal polymerization initiators are well described in "Principle of Polymerization (Wiley, 1981)", page 203, written by Odian. However, the present invention is not limited to the above-described examples.

The thermal polymerization initiator may be included at a concentration of about 0.001 to about 0.5 wt % based on the monomer composition. When the concentration of the thermal polymerization initiator is excessively low, additional thermal polymerization is hardly performed, and thus an effect of addition of the thermal polymerization initiator may be insignificant. When the concentration of the thermal polymerization initiator is excessively high, the molecular weight of the superabsorbent polymer may be small and physical properties thereof may be non-uniform.

According to an exemplary embodiment of the present invention, the monomer composition may further include an internal cross-linking agent as a raw material for the superabsorbent polymer. As the internal cross-linking agent, a cross-linking agent having at least one functional group capable of reacting with a water-soluble substituent of the water-soluble ethylene-based unsaturated monomer while having at least one ethylene-based unsaturated group, or a cross-linking agent having at least two functional groups capable of reacting with the water-soluble substituent of the monomer and/or a water-soluble substituent formed by hydrolysis of the monomer, may be used.

Specific examples of the internal cross-linking agent may include a C8-C12 bisacrylamide, bismethacrylamide, a poly(meth)acrylate of a C2-C10 polyol or a poly(meth)allylether of a C2-C10 polyol, and more specifically, at least one selected from the group consisting of N,N'-methylenebis(meth)acrylate, ethyleneoxy(meth)acrylate, polyethyleneoxy(meth)acrylate, propyleneoxy(meth)acrylate, glycerin diacrylate, glycerin triacrylate, trimethylol triacrylate, triallyl amine, triallyl cyanurate, triallyl isocyanate, polyethylene glycol, diethylene glycol, and propylene glycol.

The internal cross-linking agent may be included at a concentration of about 0.01 to about 0.5 wt % based on the monomer composition to cross-link the polymerized polymer.

In the preparation method of the present invention, the monomer composition may further include additives such as a thickener, a plasticizer, a storage stabilizer, an antioxidant, and the like, as necessary.

The above-described raw materials such as the water-soluble ethylene-based unsaturated monomer, the photopolymerization initiator, the thermal polymerization initiator, the internal cross-linking agent, and the additives may be prepared in a form of a monomer composition solution dissolved in a solvent.

Here, the solvent is usable without particular limitation in view of constitution as long as it is capable of dissolving the above-described components. For example, the solvent may be used in combination with at least one selected from water, ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methyl ethyl ketone, acetone, methyl amyl ketone, cyclohexanone, cyclopentanone, diethylene glycol monomethyl ether, diethylene glycol ethyl ether, toluene, xylene, butyrolactone, carbitol, methyl cellosolve acetate, N,N-dimethylacetamide, and the like.

The solvent may be included in a remaining amount excluding the above-described components with respect to the total content of the monomer composition.

Meanwhile, a method for forming the hydrogel polymer by thermal polymerization or photopolymerization of such a monomer composition is not particularly limited in view of constitution as long as it is a generally used polymerization method.

Specifically, the polymerization method is largely divided into thermal polymerization and photopolymerization depending on a polymerization energy source. It is usual that the thermal polymerization may be performed in a reactor having an agitator shaft such as a kneader, and the photopolymerization may be performed in a reactor equipped with a movable conveyor belt. However, these above-described polymerization methods are described by way of example, and the present invention is not limited thereto.

For example, the hydrogel polymer obtained by supplying hot air to the reactor such as the kneader equipped with the agitator shaft as described above, or heating the reactor to perform the thermal polymerization, may be discharged to a reactor outlet according to a form of the agitator shaft provided in the reactor, and may have a size of several centimeters to several millimeters. Specifically, the size of the obtained hydrogel polymer may vary depending on a concentration, an injection speed, and the like, of the monomer composition to be injected. Generally, the hydrogel polymer may have a weight average particle diameter of about 2 mm to about 50 mm.

In addition, when the photopolymerization is performed in the reactor provided with the movable conveyer belt as described above, the generally-obtained hydrogel polymer may be a sheet-shaped hydrogel polymer having a width of the belt. Here, the thickness of the polymer sheet varies depending on the concentration and the injection speed of the monomer composition to be injected, but it is preferred to supply the monomer composition so that it is possible to obtain the sheet-shaped polymer having a thickness of generally about 0.5 cm to about 5 cm. When supplying the monomer composition to such an extent that the thickness of the sheet-shaped polymer has an excessively thin thickness of less than 0.5 cm, it is not preferred since production efficiency may be low. When the thickness of the sheet-polymer is more than 5 cm, the polymerization reaction may not be uniformly performed throughout an overall thickness due to the excessively thick thickness.

Here, a moisture content of the hydrogel polymer obtained by this method may be generally 40 to 80 wt %. Meanwhile, throughout the present specification, the term "moisture content" refers to a content of moisture occupied with respect to the total weight of the hydrogel polymer, and means a value obtained by subtracting a weight of a dried polymer from the weight of the hydrogel polymer. Specifically, the water content is defined as a value calculated by measuring a weight loss due to moisture evaporation in the polymer during a drying process by raising the temperature of the polymer through infrared heating. Here, the moisture content is measured under drying conditions in which a temperature is raised from room temperature up to about 180° C., and then the temperature is maintained at 180° C., wherein a total drying time is set as 20 minutes, including 5 minutes for a temperature rising step.

According to an embodiment of the present invention, a coarse-pulverization process may optionally be further performed on the hydrogel polymer obtained above.

Here, a pulverizer to be used for the coarse-pulverization process is not limited in view of constitution, but specifically, may include any one selected from pulverizing devices groups consisting of a vertical pulverizer, a turbo cutter, a turbo grinder, a rotary cutter mill, a cutter mill, a disc mill, a shred crusher, a crusher, a chopper, and a disc cutter, and is not limited to the above-described examples.

Here, the coarse-pulverization may be performed so that a particle diameter of the hydrogel polymer is about 2 mm to about 20 mm.

It is not technically easy to perform coarse pulverization so as to have a particle diameter of less than 2 mm since the moisture content of the hydrogel polymer is high, and pulverized particles may agglomerate with each other. On the other hand, when the coarse pulverization is performed to have a particle diameter of more than 20 mm, an effect of increasing the efficiency of the subsequent drying step may not be significant.

Next, step 2 in the method for preparing a superabsorbent polymer according to an embodiment of the present invention is a step of drying and pulverizing the hydrogel polymer prepared in step 1, followed by performing classification into a fine powder and normal particles.

The drying process is performed on the hydrogel polymer which is subjected to the coarse-pulverization in step 1 or immediately after the polymerization without performing the coarse-pulverization. Here, a drying temperature of the drying step may be about 150° C. to about 250° C. When the drying temperature is less than 150° C., a drying time may be excessively lengthened, and physical properties of the finally formed superabsorbent polymer may be deteriorated, and when the drying temperature is more than 250° C., a surface of the polymer may be excessively dried, such that a fine powder may occur in the subsequent pulverization process and physical properties of the finally formed superabsorbent polymer may be deteriorated. Accordingly, preferably, the drying may be performed at a temperature of about 150 to about 200° C., and more preferably, about 160 to about 180° C.

Meanwhile, the drying may be performed for about 20 minutes to about 90 minutes in consideration of process efficiency and the like, but the time required for the drying is not limited thereto.

Any drying method of the drying step may be selected to be used without limitation in view of constitution as long as it is generally used as a drying process of the hydrogel polymer. Specifically, the drying process may be performed by hot air supply, infrared irradiation, microwave irradiation, ultraviolet irradiation, and the like. A moisture content of the polymer after the drying step is performed may be about 0.1 wt % to about 10 wt %.

Next, the dried polymer obtained by the drying step is subjected to pulverization.

The polymer powder obtained after the pulverization step may have a particle diameter of about 150 μm to about 850 μm. A pulverizer used to perform the pulverization into the above-described particle diameter may specifically be a pin mill, a hammer mill, a screw mill, a roll mill, a disc mill, a jog mill, and the like, but the present invention is not limited to the above-described examples.

In order to control physical properties of the superabsorbent polymer powder which is prepared as a final product after the pulverization step, the polymer powder obtained after pulverization is generally classified according to the particle diameter. Preferably, the polymer powder is classified into particles having a particle diameter of about 150 μm or less and particles having a particle diameter of more than about 150 to 850 μm or less.

In the present specification, fine particles having a particle size of a predetermined particle size or less, specifically 150 μm or less, are referred to as a superabsorbent polymer fine powder, a SAP fine powder, or a fine powder, and particles having a particle diameter of more than about 150 μm to about 850 μm or less are referred to as normal particles. The fine powder may occur during the polymerization process, the drying process, or the pulverization step of the dried polymer. If the fine powder is included in final products, it is difficult to handle, and physical properties may be deteriorated, for example, a gel blocking phenomenon and the like may occur. Therefore, it is preferred to exclude the fine powder so as to not include it in the final resin product or to reuse the fine powder to be normal particles.

As an example, a reassembling process in which the fine powder is agglomerated to have a normal particle size may be performed. In order to increase agglomeration strength during the reassembling process, a reassembling process in which the fine particles are agglomerated in a wet state is generally performed. Here, the higher the moisture content of the fine powder, the higher the agglomeration strength of the fine powder, but an excessively large reassembly lump may be generated during the process, causing problems during process operation. When the moisture content is lower, the reassembling process is easy, but the agglomeration strength is low, and thus there are many cases that the fine particles are crushed to be a fine powder again after the reassembling process (formation of refined powder). In addition, the obtained fine powder reassembly has lower physical properties such as centrifuge retention capacity (CRC) or absorbency under pressure (AUP) than normal particles, which causes a decrease in quality of the superabsorbent polymer.

Next, in the method for preparing a superabsorbent polymer according to an embodiment of the present invention, step 3 is a step of reassembling the fine powder classified in step 2 above to prepare a fine powder reassembly.

Specifically, the fine powder having a particle diameter of 150 µm or less classified in step 2 is mixed with water, wherein the water is added in two or more divisions with respect to the fine powder, and the fine powder is reassembled to prepare a fine powder reassembly.

Here, the mixing of the fine powder with water may be performed using a mixing device or a mixer capable of applying a shear force, wherein a time taken for forming a secondary agglomeration may be controlled by controlling a stirring linear velocity by the shear force. In the present invention, the stirring linear velocity when mixing the fine powder with water may be 6.5 to 14.5 m/s. As the stirring linear velocity increases, the time taken for forming the secondary agglomeration of the fine powder becomes shorter, but operation stability of the mixing device or the mixer is deteriorated. Specifically, when the stirring linear velocity is excessively slow such as less than 6.5 m/s, the time taken for forming the secondary agglomeration is lengthened, and thus an operation of the mixer may be stabilized, but a generation rate of refined powder in the reassembly may be increased. Further, when the stirring linear velocity is excessively fast such as more than 14.5 m/s, the time taken for forming the secondary agglomeration of the fine powder is excessively shortened. Although the obtained fine powder reassembly has sufficient assembly strength, a lump of the reassemblies is generated to increase a load on the mixer, and thus it is difficult to perform continuous operation. More preferably, the stirring linear velocity may be 8.5 to 13 m/s.

In addition, the water may be included in an amount so that the fine powder is capable of being reassembled in a wet state. Specifically, the amount of water may be 80 to 150 parts by weight, preferably 80 to 110 parts by weight, based on 100 parts by weight of the fine powder. The water is evaporated in a re-drying process after the fine powder reassembly is formed, wherein when the amount of water is less than 80 parts by weight, it is difficult to uniformly disperse a small amount of water due to a fast absorption speed of the fine powder in the mixing process of the fine powder with water, and thus uniformity of the fine powder reassembly may be deteriorated, and a generation amount of refined powder may be increased. In addition, the moisture content of the fine powder reassembly to be prepared may be lowered to form a hard lump during a subsequent process, and thus process operation stability is deteriorated and an absorption ability of the finally prepared superabsorbent polymer resin may be deteriorated. Further, when the water amount is more than 150 parts by weight, stickiness of the fine powder reassembly is increased during the mixing process, the mixing is not normally achieved, and an amount of water that is required to be evaporated during the drying process is increased, thus increasing a load on a dryer.

In addition, the water is added to in two or more divisions with respect to the fine powder.

When mixing the fine powder with water, if water is added to the fine powder in one batch, the mixing stability may be deteriorated since the added water is assembled with the fine powder and secondary agglomeration is rapidly generated. However, if the water is added in two or more divisions as described above, the water to be added divisionally after secondary addition may be dispersed and present on a surface for a long time, and thus the mixing stability may be improved. Specifically, the water may be added in two or three divisions with respect to the fine powder.

For example, when water is added in two divisions, the mixing of the fine powder with water in the method for preparing a superabsorbent polymer composition according to the present invention may include a primary primary mixing step of primarily adding water and mixing with the fine powder and a secondary mixing step of adding the remaining water secondarily and mixing with the fine powder after the primary mixing process.

In addition, when water is added in two or more divisions, the amount of water to be added is not particularly limited for each addition time, and the water may be divisionally added at an equivalent amount within the above-described addition amount range, or may be added at a different amount for each addition time.

For example, when added in two divisions, the amount of water to be primarily added may be 50 wt % or more to 90 wt % or less based on a total amount of the water to be added, and the amount of water to be secondarily added may be a remaining amount, i.e., 10 wt % or more to less than 50 wt %. It is preferable that the amount of water to be secondarily added is less than the amount of water to be primarily added. When the amount of water to be secondarily added is 50 wt % or more, the agglomeration time may be accelerated, and thus the mixing stability may be deteriorated. When the amount of water to be secondarily added is less than 10 wt %, an improvement effect by the secondary addition is not sufficient. More specifically, the amount of water to be primarily added may be 60 to 90 wt % based on the total weight of water to be added, and the amount of water to be secondarily added may be a remaining amount, i.e., 10 to 40 wt %. More specifically, the amount of water to be primarily added may be 65 to 80 wt % based on the total weight of water to be added, and the amount of water to be secondarily added may be a remaining amount, i.e., 20 to 35 wt %.

Further, in a case where the water is added in two or more divisions, the primary addition may be performed at the beginning of the mixing with the fine powder, and the secondary addition may be performed at intervals of 2 to 10 seconds, and more specifically at 2 to 5 seconds, after water is added in the previous order. When the interval at the secondary or more divisional addition is less than 2 seconds, it is difficult to obtain a sufficient effect according to the divisional addition, and when the interval exceeds 10 seconds, the interval of addition is excessively long, which is inefficient.

It is preferable that the reassembled fine powder reassembly through the above-described divisional addition is quickly discharged out of the mixer. If the reassembly is secondarily agglomerated to form a lump, it is difficult to achieve the continuous process due to an increased load on the mixer.

In addition, according to an embodiment of the present invention, as a mixture stabilizer for improving mixing stability and uniformity by promoting a lubrication action of the fine powder reassembly in a mixer when mixing the fine powder with water, at least one of a water-soluble polymer or a surfactant may be optionally further used.

Specific examples of the water-soluble polymer may include synthetic polymers such as polyethylene glycol, polyethylene oxide, polyvinyl pyrrolidone, polyvinyl alcohol, polyacrylamide, polyacrylic acid, polystyrene sulfonic acid, polysilicic acid, polyphosphoric acid, polyethylene sulfonic acid, polyvinylphenol, polyvinylphenyl sulfonic acid, polyethylene phosphoric acid, polyethylene amide, polyamine, polyamideamine, and the like; and non-synthetic polymers such as starch, rubber, and cellulose, and the like. Any one or a mixture of two or more thereof may be used. Among the water-soluble polymers, polyethylene glycol may be more preferable due to chemical stability, harmlessness to a human body, an excellent dispersion/lubrication effect, and economical characteristics.

Further, when polyethylene glycol is used, the polyethylene glycol may have a weight average molecular weight of 2000 to 200,000 g/mol, and more preferably 4000 to 100,000 g/mol. When the molecular weight of the polyethylene glycol is less than 2000 g/mol, the lubricating action may be deteriorated. When the molecular weight thereof exceeds 200,000 g/mol, solubility in water may be lowered.

Meanwhile, specific examples of the surfactant may include sodium dodecyl sulfate (SDS), diisooctyl sodium sulfosuccinate (DSS), sodium tetradecyl sulfate, sodium hexadecyl sulfate, sodium dodecylbenzene sulfonate, xylene sulfonate, sodium oleate, 4-n-decylbenzenesulfonate, sodium laurate, 4-dodecylbenzenesulfonic acid, dodecylamine hydrochloride, dodecyltrimethylammonium chloride, 4-n-octylbenzene sulfonate, ethoxylated sulfonate, decylbenzene sulfonate, potassium oleate, n-decylbenzene sulfonate, alkyltrimethylammonium bromide (C10-C16 chains), dodecyl amine, tetradecyltrimethylammonium chloride, dodecyl polysaccharide glycoside, cyclodextrin, glycolipid, lipoprotein-lipopeptide, phospholipid, para-toluene sulfonic acid, and trisiloxane. Any one or a mixture of two or more thereof may be used. Further, commercially available products such as Triton™ X-100 may also be used. Among the above surfactants, sodium dodecyl sulfate may be more preferred due to chemical stability and an excellent dispersion/lubrication effect.

These additives may be used in an amount of 0.001 to 1 part by weight, and more preferably 0.001 to 0.5 parts by weight, based on 100 parts by weight of the fine powder. When the amount of the additive is less than 0.001 parts by weight, it is difficult to obtain the effect of improving the mixing stability and uniformity of the fine powder reassembly according to the use of the additive. When the amount of the additive exceeds 1 part by weight, performance of the superabsorbent polymer may be deteriorated and discoloration may occur.

The method for preparing a superabsorbent polymer according to an embodiment of the present invention may further include mixing the fine powder reassembly prepared in step 3 with the hydrogel polymer prepared in step 1, followed by drying, pulverizing, and performing classification into a reassembly fine powder having a particle diameter of 150 μm or less (hereinafter referred to as "refined powder") and reassembly normal particles having a particle diameter of more than 150 μm to 850 μm or less (step 4).

Specifically, step 4 is a step of mixing the fine powder reassembly prepared in step 3 with the hydrogel polymer prepared in step 1, followed by drying, pulverizing, and performing classification into a reassembly fine powder and reassembly normal particles.

The drying process may be performed using a conventional dryer, but may be performed using a paddle-type dryer or a forced circulation-type dryer according to an embodiment of the present invention. When the drying process is performed in these dryers, the secondary-agglomerated fine powder reassembly may be more easily primary-particulated by force generated during the flow, and as a result, a drying speed and a drying efficiency may be increased.

Further, the drying process may be performed at a temperature of about 120° C. to about 220° C. In the drying process, when the temperature is less than 120° C., a drying time may be lengthened, and when the temperature exceeds 220° C., physical properties may be deteriorated due to deterioration of the fine powder reassembly. More preferably, the drying process may be performed at a temperature of 150 to 200° C. so that the moisture content in the fine powder reassembly is 1 wt % or less.

Further, it is preferable to increase the temperature in a latter stage of the drying process within the above-described temperature range as compared to an initial stage of the drying process since drying efficiency is capable of being further increased. Specifically, it is more preferable that a temperature at the initial stage of the drying process, specifically, at the dryer inlet, is about 120° C. to about 160° C., and a temperature at the latter stage of the drying process, specifically, at a rear end outlet of the dryer, is about 150° C. to about 200° C., to increase the drying efficiency.

In addition, the means of raising the temperature during the drying process is not limited in view of a constitution. Specifically, the raising of the temperature may be performed by supplying thermal media or directly heating by electricity and the like, but the present invention is not limited to the above-described examples. Specific examples of heat sources to be usable may include steam, electricity, ultraviolet rays, infrared rays, and the like, and may be a heated thermal fluid and the like.

In addition, the drying process may be performed simultaneously with a cutting process using a chopper. In this case, drying efficiency may be increased and drying time may be shortened.

The drying process may be performed so that the moisture content in the dried fine powder reassembly is 1 wt % or more, and more specifically, 1 to 2 wt %. When the drying is performed so that the moisture content in the dried fine powder reassembly is less than 1 wt %, physical properties of the fine powder reassembly are deteriorated.

At the time of the drying process as described above, the secondary-particulated fine powder reassembly is primary-particulated with the form of a single particle.

Next, the dried fine powder reassembly is pulverized and classified.

The dried fine powder reassembly may be pulverized to have a particle diameter of more than 150 to 850 μm or less. A pulverizer used to perform the pulverization into the above-described particle diameter may specifically be a pin mill, a hammer mill, a screw mill, a roll mill, a disc mill, a jog mill, or the like, but the present invention is not limited to the above-described examples.

In order to control physical properties of the superabsorbent polymer powder which is prepared as a final product after the pulverization step, the polymer powder obtained after pulverization is generally classified according to the particle diameter. Preferably, the polymer powder is subjected to the classifying step into refined powder having a particle diameter of 150 μm or less and reassembly normal particles having a particle diameter of more than 150 μm to 850 μm or less.

The fine powder reassembly obtained through the process above has high agglomeration strength since a proportion at which the fine powder reassembly is re-crushed again into a fine powder after the pulverization step is low. Specifically, in the fine powder reassembly, a weight ratio of the fine powder having a particle diameter of 150 μm or less after the pulverization may be about 50 wt % or less, and preferably 30 wt % or less, based on the weight of the total fine powder reassembly.

Further, according to an embodiment of the present invention, adding the reassembly normal particles classified in step 4 to a surface cross-linking mixer and mixing with the surface cross-linking agent to perform surface cross-linking (step 5) may be optionally further performed.

The surface cross-linking process is a step of increasing a cross-linking density near a surface of the superabsorbent polymer particle in relation to a cross-linking density in the particle. In general, a surface cross-linking agent is applied to the surface of the superabsorbent polymer particle. Thus, this reaction is generated on the surface of the superabsorbent polymer particles, which improves crosslinkability on the surface of the particles without substantially affecting an inside of the particles. Accordingly, surface cross-linked superabsorbent polymer particles have a higher cross-linking degree in the vicinity of the surface than in the inside.

Here, the surface cross-linking agent is not limited in view of constitution as long as it is a compound capable of reacting with a functional group of the polymer.

Preferably, in order to improve properties of the superabsorbent polymer to be prepared, as the surface cross-linking agent, at least one selected from the group consisting of a polyhydric alcohol compound; an epoxy compound; a polyamine compound; a haloepoxy compound; a condensation product of the haloepoxy compound; oxazoline compounds; a mono-, di-, or polyoxazolidinone compound; a cyclic urea compound; a polyvalent metal salt; and an alkylene carbonate compound, may be used.

Specific examples of the polyhydric alcohol compound may include at least one selected from the group consisting of mono-, di-, tri-, tetra-, or polyethylene glycol, monopropylene glycol, 1,3-propanediol, dipropylene glycol, 2,3,4-trimethyl-1,3-pentanediol, polypropylene glycol, glycerol, polyglycerol, 2-butene-1,4-diol, 1,4-butanediol, 1,3-butanediol, 1,5-pentanediol, 1,6-hexanediol, and 1,2-cyclohexane dimethanol.

Further, the epoxy compound may be ethylene glycol diglycidyl ether and glycidol, poly(ethylene glycol)diglycidyl ether, or the like. The polyamine compound may be at least one selected from the group consisting of ethylene diamine, diethylene triamine, triethylenetetramine, tetraethylenepentamine, pentaethylenehexamine, polyethylene imine, and polyamide polyamine.

Further, the haloepoxy compound may be epichlorohydrin, epibromohydrin, and α-methyl epichlorohydrin. Meanwhile, examples of the mono-, di-, or polyoxazolidinone compound may include 2-oxazolidinone and the like.

In addition, ethylene carbonate, or the like, may be used as the alkylene carbonate compound. The above-described compounds may be used alone, respectively, or may be combined with each other. Meanwhile, in order to increase efficiency of the surface cross-linking process, it is preferable to use at least one polyhydric alcohol compound among these surface cross-linking agents, more preferably a polyhydric alcohol compound having 2 to 10 carbon atoms.

The content of the surface cross-linking agent to be added may be appropriately selected depending on the specific kind of the surface cross-linking agent to be added and reaction conditions, but generally, may be about 0.001 to about 5 parts by weight, preferably about 0.01 to about 3 parts by weight, and more preferably about 0.05 to about 2 parts by weight, with respect to 100 parts by weight of the polymer.

When the content of the surface cross-linking agent is excessively small, a surface cross-linking reaction hardly occurs. When the content of the surface cross-linking agent is more than 5 parts by weight with respect to 100 parts by weight of the polymer, absorption ability and physical properties may be deteriorated due to excessive surface cross-linking reaction.

The surface cross-linking reaction and the drying may be performed simultaneously by heating the polymer particles to which the surface cross-linking agent is added.

The means of raising the temperature for the surface cross-linking reaction is not particularly limited. The polymer particles may be heated by supplying thermal media or directly supplying heat sources. Here, examples of the thermal media to be usable may include temperature-raising fluids such as steam, hot air, and hot oil, and the like. However, the present invention is not limited to the above-described examples. In addition, a temperature of the supplied thermal media may be appropriately selected in consideration of the means of thermal media, the raising rate of the temperature, and a target temperature in raising the temperature. Meanwhile, examples of the heat source to be directly supplied may include heating through electricity and heating through gas. However, the present invention is not limited to the above-described examples.

Further, after the surface cross-linking, the fine powder may be classified into a surface cross-linked fine powder having a particle diameter of 150 μm or less and surface cross-linked normal particles having a particle diameter of more than 150 μm to 850 μm or less, and the surface cross-linked a fine powder having a particle diameter of 150 μm or less may be re-put into a process for fine powder reassembly, and the surface cross-linked normal particles may be prepared and used as products.

The superabsorbent polymer prepared by the above-described method is a superabsorbent polymer in which a fine powder reassembly, which is obtained by mixing a fine powder with water and performing reassembly, is subjected to surface cross-linking, wherein the fine powder has a particle diameter of 150 μm or less in a polymer obtained by polymerizing a water-soluble ethylene-based unsaturated monomer in which an acidic group is included and at least one portion of the acidic group is neutralized, wherein centrifuge retention capacity (CRC) measured according to the EDANA method WSP 241.3 is 33.0 to 39.0 g/g; absorbency under pressure (AUP) under 0.3 psi measured according to the EDANA method WSP 241.3 is 20.0 to 33.0 g/g; and an absorption speed by a vortex method is 100 seconds or less.

In the superabsorbent polymer of an exemplary embodiment, the polymer is obtained by polymerizing the water-soluble ethylene-based unsaturated monomer in which the acidic group is included and at least one portion of the acidic group is neutralized. Specific details of specific materials used therefor and a preparation method thereof are the same as those illustrated above.

Hereinafter, the present invention is described in more detail with reference to examples. However, the following examples are only illustrative of the present invention, and do not limit the disclosure of the present invention in any way. Further, unless otherwise specified, "%" and "part" representing the content in the following examples and comparative examples are on a weight basis.

<Preparation of Fine Powder>

PREPARATION EXAMPLE 1

100 g of acrylic acid, 0.3 g of polyethylene glycol diacrylate as a cross-linking agent, 0.033 g of sodium persulfate as a polymerization initiator, 38.9 g of caustic soda (NaOH), and 103.9 g of water were mixed to prepare a monomer mixture having a monomer concentration of 50 wt %.

Then, the monomer mixture was put on a continuously moving conveyor belt, irradiated with ultraviolet light (irradiation amount: 2 mW/cm$^2$), followed by UV polymerization for 2 minutes, thereby obtaining a hydrogel polymer.

The hydrogel polymer was pulverized with a meat chopper (hole size of 10 mm) to obtain a coarse-pulverized hydrogel polymer. The hydrogel polymer was dried in a hot air dryer at 170° C. for 1 hour, pulverized with a pin mill, and classified with a standard mesh of the ASTM standard to obtain normal particles having a particle size of more than 150 μm to 850 μm or less and fine powder particles having a particle diameter of 150 μm or less.

<Preparation of Fine Powder Reassembly>

Example 1-1

100 g of the fine powder having a particle size of 150 μm or less prepared in Preparation Example 1 was put into a mixer, and while stirring at a linear velocity of 8.51 m/s, 77 g of water was primarily added, and after 2 seconds, 33 g of water was secondarily added, and stirred. Here, a time taken from completion of the secondary addition of water to secondary agglomeration was measured, and the mixer stirring was stopped immediately after a load of the mixer was increased since the fine powder reassembly formed a lump. The time taken for forming the secondary agglomeration was 13 seconds.

After the stirring, the resultant fine powder reassembly was put into a forced circulation-type dryer and dried at 180° C. for 60 minutes to recover the fine powder reassembly.

Example 1-2

A fine powder reassembly was recovered in the same manner as in Example 1-1, except that the linear velocity was adjusted to 12.8 m/s when stirring the fine powder. The time taken for forming the secondary agglomeration was 7 seconds.

COMPARATIVE EXAMPLE 1-1

A fine powder reassembly was recovered in the same manner as in Example 1-1, except that the linear velocity was adjusted to 4.25 m/s when stirring the fine powder. The time taken for forming the secondary agglomeration was 58 seconds.

COMPARATIVE EXAMPLE 1-2

A fine powder reassembly was recovered in the same manner as in Example 1-1, except that the linear velocity was adjusted to 16.6 m/s when stirring the fine powder. The time taken for forming the secondary agglomeration was 5 seconds.

Example 2-1

100 g of the fine powder having a particle size of 150 μm or less prepared in Preparation Example 1 was put into a mixer, and while stirring at a linear velocity of 8.51 m/s, 3.7 g of an aqueous solution containing 0.1 wt % of sodium dodecyl sulfate (SDS) and 74.4 g of water were primarily added, and after 2 seconds, 31.9 g of water was secondarily added, and stirred. Here, time taken from completion of the secondary addition of water to secondary agglomeration was measured, and the mixer stirring was stopped immediately after a load of the mixer was increased since the fine powder reassembly formed a lump. The time taken for forming the secondary agglomeration was 23 seconds.

The resultant fine powder reassembly was put into a forced circulation-type dryer and dried at 180° C. for 60 minutes to recover the fine powder reassembly.

Example 2-2

A fine powder reassembly was recovered in the same manner as in Example 2-1, except that the linear velocity was adjusted to 12.8 m/s when stirring the fine powder. The time taken for forming the secondary agglomeration was 10 seconds.

Example 2-3

A fine powder reassembly was recovered in the same manner as in Example 2-1, except that 31.9 g of water was primarily added, and after 2 seconds, 74.4 g of water was secondarily added when adding water. The time taken for forming the secondary agglomeration was 18 seconds.

Example 2-4

A fine powder reassembly was recovered in the same manner as in Example 2-1, except that 35.4 g of water was primarily added, and after 2 seconds, 35.4 g of water was secondarily added, and after 2 seconds, 35.4 g of water was tertiarily added when adding water. The time taken for forming the secondary agglomeration was 19 seconds.

Example 2-5

A fine powder reassembly was recovered in the same manner as in Example 1-1, except that 56 g of water was primarily added, and after 2 seconds, 54 g of water was secondarily added when adding water. The time taken for forming the secondary agglomeration was 13 seconds.

COMPARATIVE EXAMPLE 2-1

A fine powder reassembly was recovered in the same manner as in Example 2-1, except that the linear velocity was adjusted to 4.25 m/s when stirring the fine powder. The time taken for forming the secondary agglomeration was 85 seconds.

COMPARATIVE EXAMPLE 2-2

A fine powder reassembly was recovered in the same manner as in Example 2-1, except that the linear velocity was adjusted to 16.6 m/s when stirring the fine powder. The time taken for forming the secondary agglomeration was 8 seconds.

COMPARATIVE EXAMPLE 2-3

A fine powder reassembly was recovered in the same manner as in Example 2-1, except that water was added in one batch. The time taken for forming the secondary agglomeration was 11 seconds.

COMPARATIVE EXAMPLE 3-1

100 g of the fine powder having a particle size of 150 μm or less prepared in Preparation Example 1 was put into a mixer, and while stirring at a linear velocity of 4.25 m/s, 110 g of water was added in one batch and stirred. Here, time taken from completion of water addition to secondary agglomeration was measured, and the mixer stirring was stopped immediately after a load of the mixer was increased since the fine powder reassembly formed a lump. The time taken for forming the secondary agglomeration was 28 seconds.

The resultant fine powder reassembly was put into a forced circulation-type dryer and dried at 180° C. for 60 minutes to recover the fine powder reassembly.

COMPARATIVE EXAMPLE 3-2

A fine powder reassembly was recovered in the same manner as in Comparative Example 3-1, except that the linear velocity was adjusted to 8.51 m/s when stirring the fine powder. The time taken for forming the secondary agglomeration was 9 seconds.

COMPARATIVE EXAMPLE 3-3

A fine powder reassembly was recovered in the same manner as in Comparative Example 3-1, except that the linear velocity was adjusted to 12.8 m/s when stirring the fine powder. The time taken for forming the secondary agglomeration was 4 seconds.

<Preparation of Superabsorbent Polymer>

Example 3-1

The fine powder reassembly prepared in Example 1-1 was mixed with the hydrogel polymer prepared in the polymerization in the method for preparing the fine powder in Preparation Example 1 in a weight ratio of 20:80, chopped, dried, pulverized by a roll mill, and classified into a reassembly fine powder having a particle diameter of 150 μm or less and reassembly normal particles having a particle diameter of more than 150 μm to 850 μm or less using a standard mesh with the ASTM standard.

100 g of the classified reassembly normal particles were mixed with a surface cross-linking solution including 0.2 g of poly(ethylene glycol)diglycidylether, 5 g of methanol, 4 g of water, and 0.01 g of silica aerogel (AeroZel™, JIOS), followed by a surface cross-linking reaction at a temperature of 180° C. for 60 minutes, thereby obtaining a final superabsorbent polymer.

Examples 3-2 to 3-7

Superabsorbent polymers were prepared in the same manner as in Example 3-1 except that the fine powder reassemblies prepared in Examples 1-2 and 2-1 to 2-5 were used, respectively, instead of the fine powder reassembly prepared in Example 1-1.

COMPARATIVE EXAMPLE 4-1

A superabsorbent polymer was obtained in the same manner as in Example 3-1, except that the fine powder reassembly prepared in Comparative Example 1-1 was used instead of the fine powder reassembly prepared in Example 1-1.

COMPARATIVE EXAMPLES 4-2 to 4-8

Superabsorbent polymers were prepared in the same manner as in Example 3-1, except that the fine powder reassemblies prepared in Comparative Examples 1-2 and 2-1 to 2-3 and Comparative Examples 3-1 to 3-3 were used, respectively, instead of the fine powder reassembly prepared in Example 1-1.

EXPERIMENTAL EXAMPLE 1

In preparation of the fine powder reassemblies according to Examples 1-1 to 2-2 and Comparative Examples 1-1 to 3-3, the time taken for forming the secondary agglomeration according to the stirring linear velocity was compared. Results thereof are shown in FIG. 1.

In FIG. 1, a indicates results of Example 1-1, b indicates results of Example 1-2, c indicates results of Comparative Example 1-1, d indicates results of Comparative Example 1-2, e indicates results of Example 2-1, f indicates results of Example 2-2, g indicates results of Comparative Example 2-1, h indicates results of Comparative Example 2-2, i indicates results of Comparative Example 3-1, j indicates results of Comparative Example 3-2, and k indicates results of Comparative Example 3-3.

As a result of the experiment, it was confirmed that the time taken for forming the secondary agglomeration was shortened as the stirring linear velocity was increased under the same conditions such as water addition and the like, during the preparation of the fine powder reassembly.

Further, in Examples 2-1 and 2-2 and Comparative Examples 2-1 to 2-2, the time taken for forming the secondary agglomeration was lengthened as compared with Examples 1-1 and 1-2 and Comparative Examples 1-1 to 1-2, respectively, under the same stirring linear velocity and water addition conditions. This is because the mixing stability was improved by further adding the mixture stabilizer when water was added to the fine powder.

Further, in Comparative Example 1-1 and Examples 1-1 and 1-2 in which water was added divisionally, the time taken for forming the secondary agglomeration was lengthened as compared with Comparative Examples 3-1 to 3-3, respectively in which water was added in one batch under the same stirring linear velocity condition. This is because water was dispersed on a surface of the fine powders for a long period of time due to the divisional addition of water, thus increasing the mixing stability.

EXPERIMENTAL EXAMPLE 2

Figure 2:
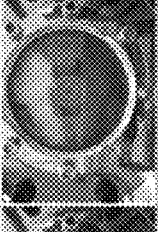
FIG. 2 is an image showing changes in an inner state of a mixer and a shape of the fine powder reassembly depending on a stirring time in the process for preparing the fine powder reassembly in Example 1-1.

An inner state of the mixer and a shape of the fine powder reassembly according to a stirring time at the time of preparing the fine powder reassembly in Example 1-1 were observed. Results thereof are shown in FIG. 2.

As a result of the observation, the fine powder was reassembled in the mixer immediately after the secondary addition of water was completed, and as the stirring time passed, the secondary agglomeration was generated, and the reassembly became a lump. Specifically, the secondary agglomeration was generated at a stirring time of 13 seconds, and when taken out from the mixer after the stirring was completed, the lump was formed.

EXPERIMENTAL EXAMPLE 3

Experimental Example 3 was performed in the same manner as in Example 1-1 to prepare a fine powder reassembly, except that the stirring time was changed to 5 seconds, 10 seconds, and 20 seconds. An effect of the stirring time on the fine powder reassembly was confirmed by observing the change in physical properties of the fine powder reassembly to be prepared.

The physical properties of the fine powder reassembly were measured by the following methods, and results thereof are shown in Table 1 below.

(1) Centrifuge retention capacity (CRC): measured according to the EDANA WSP 241.3 method. 0.2 g of a fine powder reassembly sample having a particle diameter of more than 300 μm to 600 μm or less in the prepared fine powder reassembly was put into a tea bag and precipitated in a 0.9% brine solution for 30 minutes. Then, dehydration was performed for 3 minutes with 250 G (gravity) of centrifugal force, and an amount $W_2$ (g) at which the brine solution was absorbed was measured. In addition, the same operation was performed without using the fine powder reassembly, and then an amount $W_1$ (g) was measured.

The CRC (g/g) was calculated according to the following Equation 1 using each of the thus-obtained masses, thereby confirming the CRC.

$$CRC(g/g) = \{[W_2(g) - W_1(g)]/W_0(g)\} - 1 \quad \text{[Equation 1]}$$

In Equation 1, $W_0$ (g) is an initial weight (g) of the fine powder reassembly, $W_1$ (g) is a weight of a device, measured after dehydration at 250 G for 3 minutes using a centrifuge without using the fine powder reassembly, and $W_2$ (g) is a weight of the device, measured by including the fine powder reassembly which is obtained after immersing the fine powder reassembly in 0.9 wt % physiological saline at room temperature for 30 minutes for absorption, and then dehydrating the fine powder reassembly at 250 G for 3 minutes using a centrifuge.

(2) Base polymer index (BPI): with respect to a fine powder reassembly sample having a particle diameter of more than 300 μm to 600 μm or less among the prepared fine powder reassemblies, the centrifuge retention capacity (CRC, unit: g/g) by the EDANA 441.2-02 test method, the amount of water-soluble component (unit: wt %) by the EDANA 270.2 test method, and the absorbency under pressure (AUP, unit: g/g) under a load of 0.7 psi by the EDANA 442.2-02 test method were measured, and the BPI was calculated according to the following Equation 2.

$$BPI = \frac{CRC + 8.7585}{\ln[\text{amount of water-soluble component}]} \quad \text{[Equation 2]}$$

(3) Refined ratio (wt %): The prepared fine powder reassembly was pulverized with a hammer mill and classified, and then an amount of refined powder having a particle diameter of 150 μm or less was measured. From the result, an amount ratio of the refined powder (proportion of refined powder) with respect to the total amount of fine powder reassembly was calculated.

TABLE 1

| Stirring time (s) | | 5 | 10 | 20 |
|---|---|---|---|---|
| Physical properties | CRC (g/g) | 33.8 | 34.3 | 35.5 |
| | BPI | 15.8 | 15.9 | 15.1 |
| | Refined ratio (wt %) | 28.9 | 28.6 | 28.6 |

As an experiment result, it was confirmed that physical properties of the fine powder reassembly to be prepared were almost the same even when the stirring time was changed.

EXPERIMENTAL EXAMPLE 4

In the preparation of the fine powder reassemblies according to Examples 1-1 and 1-2 and Comparative Example 1-1, a change in the time taken for forming the secondary agglomeration according to the stirring linear velocity and changes in physical properties of the fine powder reassemblies to be prepared were observed.

The physical properties of the fine powder reassemblies were measured in the same manner as in Experimental Example 3, and results thereof are shown in Table 2 below.

TABLE 2

| | | Comparative Example 1-1 | Comparative Example 1-2 | Example 1-1 | Example 1-2 |
|---|---|---|---|---|---|
| Stirring linear velocity (m/s) | | 4.25 | 16.6 | 8.51 | 12.8 |
| Time taken for forming secondary agglomeration (s) | | 58 | 5 | 13 | 7 |
| Physical properties | CRC (g/g) | 33.7 | 35.8 | 34.3 | 35.3 |
| | BPI | 15.8 | 15.6 | 15.9 | 15.7 |
| | Refined ratio (%) | 33.9 | 28.9 | 28.6 | 29.2 |

As an experimental result, as the stirring linear velocity was increased, the time taken for forming the secondary agglomeration was shortened, but the physical properties of the fine powder reassembly to be prepared were similar to each other. However, when the stirring speed was increased to 8.51 m/s or more, the refined ratio was reduced as compared to the stirring linear velocity of 4.25 m/s. From this, it could be appreciated that by controlling the stirring linear velocity, the refined ratio could be reduced while maintaining excellent physical properties of the superabsorbent polymer.

EXPERIMENTAL EXAMPLE 5

In the preparation of the fine powder reassemblies according to Examples 1-1, 2-1, 2-3, 2-4, 2-5, and Comparative Example 3-2, changes in the time taken for forming the secondary agglomeration according to the divisional addition of water and the added amount of water under the same linear velocity condition were observed. Results thereof are shown in Table 3 below.

TABLE 3

| | Added amount of mixture stabilizer aqueous solution (g) | Primary-added amount of water (g) | Secondary-added amount of water (g) | Tertiary-added amount of water (g) | Time taken for forming secondary agglomeration (s) |
|---|---|---|---|---|---|
| Comparative Example 3-2 | 0 | 110 | 0 | 0 | 9 |
| Example 1-1 | 0 | 77 | 33 | 0 | 13 |
| Example 2-5 | 0 | 56 | 54 | 0 | 13 |
| Example 2-1 | 3.7 | 74.4 | 31.9 | 0 | 23 |
| Example 2-3 | 3.7 | 31.9 | 74.4 | 0 | 18 |
| Example 2-4 | 3.7 | 35.4 | 35.4 | 35.4 | 19 |

From the changes in time taken for forming the secondary agglomeration according to the change of the number of times of addition of water and the added amount of water, it was shown that when water was added in two divisions as in the examples, the time taken for forming the second agglomeration was 13 seconds or longer, thereby exhibiting the mixing stability.

Meanwhile, when the added amount of water during the second addition was larger than an initial addition of water (Example 2-3), or when the water was added in three divisions (Example 2-4), the mixing stability was deteriorated as compared to Example 2-1, but was improved as compared to Comparative Example 3-2 in which water was added in one batch.

From this, it could be appreciated that when mixing the fine powder with water, a case where water is added divisionally rather than adding water in one batch, and a case where the primary-added amount of water was larger than the secondary-added amount of water when adding water in two divisions, were more advantageous in view of stability.

EXPERIMENTAL EXAMPLE 6

With respect to the superabsorbent polymer prepared in Example 3-1, the CRC, 0.3 AUP, and vortex were measured, respectively.

(1) Centrifuge retention capacity (CRC): measured in the same manner as in Experimental Example 3.

(2) Absorbency under pressure (AUP) under 0.3 psi: measured according to the EDANA WSP 242.3 method. Specifically, a 400 mesh wire net made of stainless steel was mounted on a cylindrical bottom of a plastic vessel having an inner diameter of 60 mm. The superabsorbent polymer $W_0$ (g) (0.90 g) was uniformly sprayed on the wire net under conditions conditions of room temperature and humidity of 50%, and a piston capable of uniformly applying a load of 0.3 psi thereon was placed, wherein an outer diameter was slightly smaller than 60 mm and there was no significant gap between an inner wall of the cylinder without interruption of up and down movements. At this time, a weight $W_3$ (g) of the device was measured.

A glass filter having a diameter of 90 mm and a thickness of 5 mm was placed inside a Petri dish having a diameter of 150 mm, and a physiological saline solution composed of 0.9 wt % sodium chloride was adjusted to have the same level as an upper surface of the glass filter. One sheet of filter paper having a diameter of 90 mm was placed thereon. The measuring device was placed on a filter paper, and the liquid was absorbed under a load for 1 hour. After 1 hour, the measuring device was lifted and a weight $W_4$ (g) was measured.

The absorbency under pressure (g/g) was calculated according to the following Equation 3 using each obtained mass.

$$AUP(g/g)=[W_4(g)-W_3(g)]/W_0(g) \quad \text{[Equation 3]}$$

(3) Absorption speed (Vortex)

50 ml of a saline solution was put into a 100 ml beaker together with a magnetic bar, and the stirring speed was set to 600 rpm using a stirrer. 2.0 g of the superabsorbent polymer prepared in Example 3-1 was added to the stirring saline, and simultaneously the time was measured. The time measurement was terminated at the point when the vortex disappeared beaker.

As an experimental result, the superabsorbent polymer of Example 3-1 had a CRC of 34.2 g/g, AUP under 0.3 psi of 28.7 g/g, and an absorption speed of 35 seconds.

The invention claimed is:

1. A method for preparing a superabsorbent polymer, comprising:
   preparing a hydrogel polymer by performing thermal polymerization or photopolymerization on a monomer composition comprising a water-soluble ethylene-based unsaturated monomer and a polymerization initiator;
   drying the hydrogel polymer to form a dried polymer;
   pulverizing the dried polymer to form a pulverized polymer;
   classifying the pulverized polymer into a fine powder having a particle diameter of 150 μm or less and a normal particle having a particle diameter of more than 150 μm to 850 μm or less; and
   preparing a fine powder reassembly by mixing the fine powder with water while stirring at a linear velocity of 6.5 to 14.5 m/s, followed by reassembling,
   wherein the water is added to the fine powder in two divisions or more in the mixing of the fine powder and water.

2. The method of claim 1, wherein the water is added to the fine powder in two divisions in the mixing of the fine powder and water, and wherein the water is primarily added in an amount of more than 50 wt % to 90 wt % or less based on a total amount of the water to be added, and a remaining amount of the water is secondarily added.

3. The method of claim 1, wherein the water is mixed in an amount of 80 to 150 parts by weight based on 100 parts by weight of the fine powder in the mixing of the fine powder and water.

4. The method of claim 1, wherein a mixture stabilizer is further added in the mixing of the fine powder and water, wherein the mixture stabilizer is a water-soluble polymer, a surfactant, or a mixture thereof.

5. The method of claim 4, wherein the mixture stabilizer is added in an amount of 0.001 to 1 part by weight based on 100 parts by weight of the fine powder.

6. The method of claim 4, wherein the water-soluble polymer comprises polyethylene glycol, polyethylene oxide, polyvinyl pyrrolidone, polyvinyl alcohol, polyacrylamide, polyacrylic acid, polystyrene sulfonic acid, polysilicic acid, polyphosphoric acid, polyethylene sulfonic acid, polyvinylphenol, polyvinylphenyl sulfonic acid, polyethylene phosphoric acid, polyethylene amide, polyamine, polyamideamine, starch, rubber, or cellulose or a mixture thereof.

7. The method of claim 4, wherein the surfactant comprises sodium dodecyl sulfate, diisooctyl sodium sulfosuccinate, sodium tetradecyl sulfate, sodium hexadecyl sulfate, sodium dodecylbenzene sulfate, xylene sulfonate, sodium oleate, 4-n-decylbenzenesulfonate, sodium laurate, 4-dodecylbenzenesulfonic acid, dodecylamine hydrochloride, dodecyltrimethylammonium chloride, 4-n-octylbenzene sulfonate, ethoxylated sulfonate, decylbenzene sulfonate, potassium oleate, n-decylbenzene sulfonate, alkyltrimethylammonium bromide, dodecyl amine, tetradecyltrimethylammonium chloride, dodecyl polysaccharide glycoside, cyclodextrin, glycolipid, lipoprotein-lipopeptide, phospholipid, para-toluene sulfonic acid, or trisiloxane or a mixture thereof.

8. The method of claim 4, wherein the mixture stabilizer comprises at least one of polyethylene glycol or sodium dodecyl sulfate.

9. The method of claim 1, further comprising
mixing the fine powder reassembly with the hydrogel polymer, followed by drying, pulverizing, and performing classification into a reassembly fine powder having a particle diameter of 150 μm or less and a reassembly normal particle having a particle diameter of more than 150 μm to 850 μm or less.

10. The method of claim 9, further comprising
performing surface cross-linking by mixing the reassembly normal particle with a surface cross-linking agent.

* * * * *